UNITED STATES PATENT OFFICE.

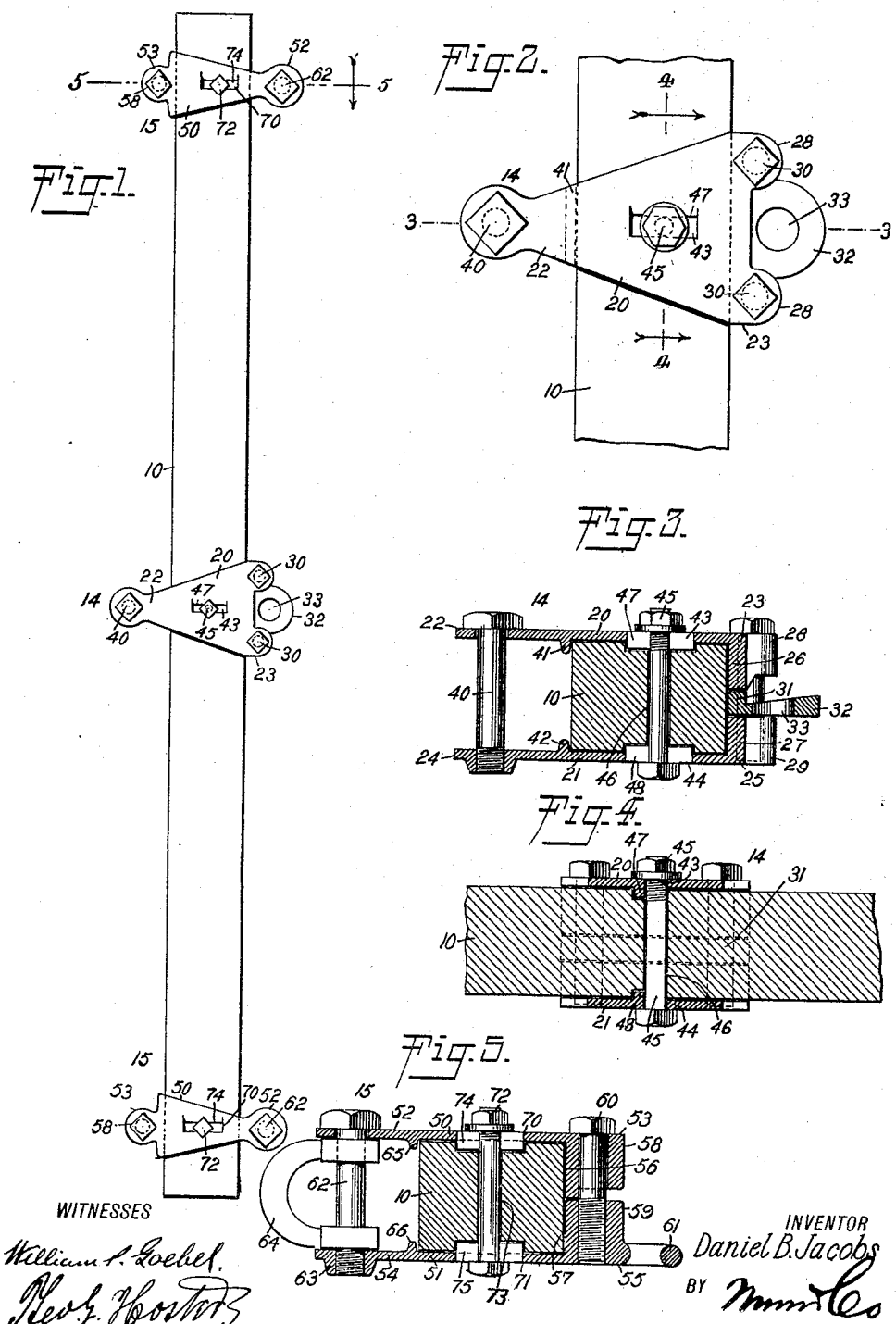

DANIEL BRADFORD JACOBS, OF CHICAGO, ILLINOIS.

DOUBLETREE-CLIP.

1,198,234.     Specification of Letters Patent.     Patented Sept. 12, 1916.

Application filed January 10, 1916. Serial No. 71,291.

*To all whom it may concern:*

Be it known that I, DANIEL B. JACOBS, a citizen of the United States, and a resident of Chicago, in the county of Cook and State of Illinois, have invented a new and Improved Doubletree-Clip, of which the following is a full, clear, and exact description.

The object of the invention is to provide a new and improved doubletree clip arranged to securely hold the clip against slipping endwise on a doubletree or an evener, and to relieve the attaching bolt of all strain incident to the pull exerted by the draft animal.
In order to accomplish the desired result, use is made of top and bottom plates extending respectively across the top and bottom of a doubletree or an evener, the said plates having slots extending endwise of the plates intermediate the projecting ends thereof, and a bolt passing through said slots and through the doubletree or evener.

A practical embodiment of the invention is represented in the accompanying drawings forming a part of this specification, in which similar characters of reference indicate corresponding parts in all the views.

Figure 1 is a plan view of the clip as applied to a doubletree; Fig. 2 is an enlarged plan view of the center clip; Fig. 3 is a sectional side elevation of the same on the line 3—3 of Fig. 2; Fig. 4 is a cross section of the same on the line 4—4 of Fig. 2; and Fig. 5 is an enlarged sectional side elevation of one of the end clips, the section being on the line 5—5 of Fig. 1.

The doubletree or evener 10 is provided at its middle with a clip 14 connecting the doubletree with a vehicle pole, and near the ends of the doubletree 10 are arranged similar clips 15. The clip 14 is formed of a top plate 20 and a bottom plate 21, the plates extending across the top and bottom of the doubletree 10, and the said plates 20 and 21 being provided with extensions 22, 23 and 24, 25 extending beyond the opposite sides of the doubletree 10. The extensions 23 and 25 are provided with integral flanges 26, 27 extending toward each other and abutting against the corresponding side of the doubletree 10, and the said flanges 26 and 27 are provided with bosses 28, 29 extending toward each other and merging with the flanges 26, 27. The bolts 30 pass loosely through the bosses 28 and screw into the bosses 29 thus connecting the plates 20 and 21 with each other at one side of the doubletree 10. A washer 31 is interposed between the flanges 26 and 27 and abuts against the corresponding side of the doubletree 10, and this washer extends between the bosses 28 and 29 and through it pass bolts 30. The washer 31 is provided with an extension 32 having an aperture 33 for engagement by a draw pin to connect the doubletree with the pole of the vehicle.

The extensions 22 and 24 are connected with each other by a bolt 40 spaced from the adjacent side of the doubletree 10, and the under sides of the extensions 22 and 24 are provided with integral ribs 41 and 42 abutting against this side of the doubletree 10. The plates 20 and 21 are provided intermediate the projections 22, 23 and 24, 25 with apertures 43, 44, through which extends a bolt 45 also passing through a hole 46 formed in the doubletree 10. The plates 20 and 21 are further provided adjacent one of the walls of the apertures 43, 44 with lugs 47, 48 extending toward each other and embedded in the top and bottom of the doubletree 10. By the use of the lugs 47, 48 and the bolt 45 the clip is held against endwise movement on the doubletree 10, and by providing the plates with the abutment flanges 26, 27 and the abutment lugs 41, 42, the bolt 45 is relieved of all undue strain and consequently the bolt is not liable to split or otherwise injure the doubletree 10.

The end clips 15 are alike in construction and each is provided with top and bottom plates 50, 51 extending across the top and bottom of the doubletree 10 and being provided with extensions 52, 53 and 54, 55 extending beyond the opposite sides of the doubletree 10. The extensions 53, 55 are provided with integral flanges 56, 57 extending toward each other and fitting against the corresponding side of the doubletree 10, and the said flanges 56, 57 are provided with lugs 58, 59 extending toward each other and merging with the flanges 56 and 57. A bolt 60 passes loosely through the lug 58 and screws into the lug 59 thus connecting the plates 50 and 51 with each other at one side of the doubletree 10. The bottom plate 51 is provided with an integral eye 61 extending beyond the lug 59 for connection with a stay chain in case the latter is used.

The extensions 52, 54 are connected with each other by a bolt 62 which extends through the extension 52 and screws into a boss 63 formed on the extension 54 of the bottom plate 51. A clevis 64 has its ends engaging the bolts 62 and the clevis ends fitting between the extensions 52 and 54. The opposite sides of the extensions 52 and 54 are provided with short lugs 65, 66 abutting against this side of the doubletree 10, as plainly indicated in Fig. 5.

The top and bottom plates 50 and 51 are provided with registering apertures 70 and 71 through which extends a bolt 72 also passing through a hole 73 formed in the doubletree 10. Lugs 74, 75 extend from the opposite faces of the top and bottom plates 50 and 51 toward each other and are embedded in the top and bottom of the doubletree 10. The lugs 74 and 75 are preferably adjacent one wall of the apertures 70 and 71, and in case the plates 50 and 51 are drop forged, the lugs 74 and 75 as well as the lugs 47, 48 previously mentioned are struck up in forming the apertures 70 and 71 or 43, 44. It will be noticed that the bolt 72 as well as the lugs 74, 75 hold the clip against endwise movement on the doubletree 10, and the bolt 72 is relieved of undue strain exerted by the draft animal on the clips 64 owing to the flanges 56, 57 abutting against the outer side of the doubletree 10.

The doubletree clip shown and described is very simple in construction and composed of comparatively few parts, not liable to get easily out of order. It will also be noticed that the doubletree clip can be readily applied to a doubletree or evener without the aid of skilled labor.

It will be noticed that by the arrangement described the clip can be readily tightened in case the wood of the doubletree shrinks, and the clip can be readily applied to doubletrees of different thicknesses.

Having thus described my invention, I claim as new and desire to secure by Letters Patent:

1. A whiffletree clip, comprising two plates extending across the top and bottom of the whiffletree with their ends projecting beyond the sides of the same, the plates having on their inner faces ribs engaging one side of the whiffletree and inwardly extending flanges engaging the other side of the whiffletree, the said plates being provided with longitudinally extending registering slots and struck up lugs adjacent the slots and embedded in the whiffletree, a bolt extending through the slots of the plates and the whiffletree, and means for connecting the plates together at each side of the whiffletree.

2. A doubletree clip, comprising top and bottom plates extending respectively across the top and bottom of the doubletree, both ends of each plate projecting beyond the sides of the doubletree, the plates having registering apertures and struck up lugs adjacent the apertures and embedded in the top and bottom of the doubletree, the said plates having at one end integral abutment flanges extending toward each other and abutting against one side of the doubletree, an apertured washer between the said flanges and having an apertured extension, a bolt passing through the said registering apertures and through the doubletree, bolts passing through the said abutment flanges and washer, and a bolt passing through the other ends of the plates at the other side of the doubletree and spaced from the said side.

3. A doubletree clip, comprising top and bottom plates extending respectively across the top and bottom of the doubletree, both ends of each plate projecting beyond the sides of the doubletree, the plates having registering apertures and struck up lugs adjacent the apertures and embedded in the top and bottom of the doubletree, the said plates having on their inner faces intermediate their ends, ribs engaging one side of the doubletree and at one end integral abutment flanges extending toward each other and abutting against the other side of the doubletree, a bolt passing through the said registering apertures and through the doubletree, bolts passing through the said abutment flanges, and a bolt passing through other ends of the plates at the other side of the doubletree and spaced from the said side.

In testimony whereof I have signed my name to this specification in the presence of two subscribing witnesses.

DANIEL BRADFORD JACOBS.

Witnesses:
  MABELLE ORTLEPP,
  FRANK KILLNER.

Copies of this patent may be obtained for five cents each, by addressing the "Commissioner of Patents, Washington, D. C."